Sept. 8, 1942.    J. S. McGUIRE    2,295,229
APPARATUS FOR CONTOURING THE ENDS OF TUBULAR STOCK
Filed Dec. 23, 1940    3 Sheets-Sheet 1
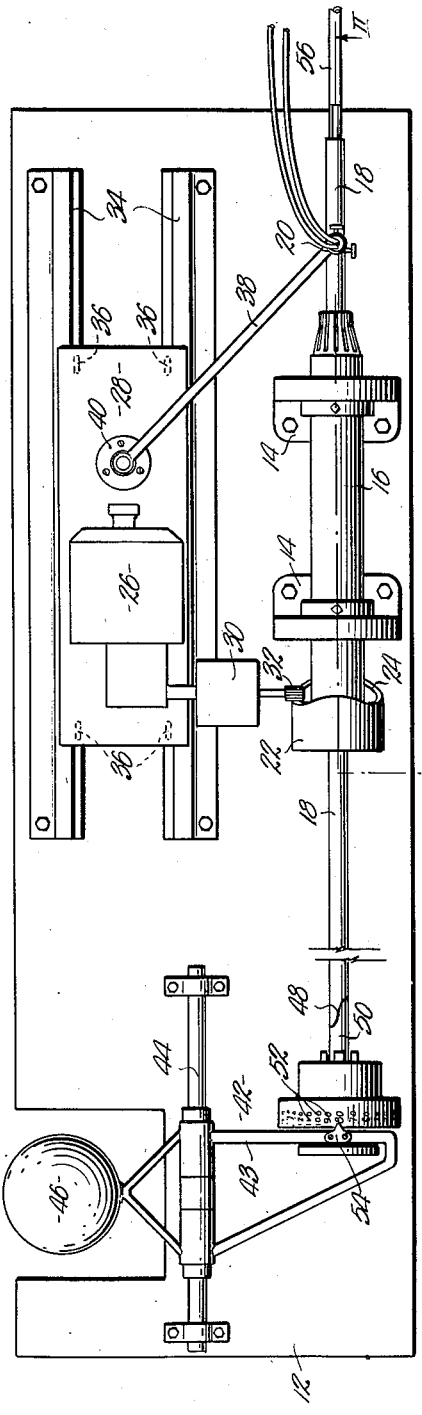
Fig. 1.
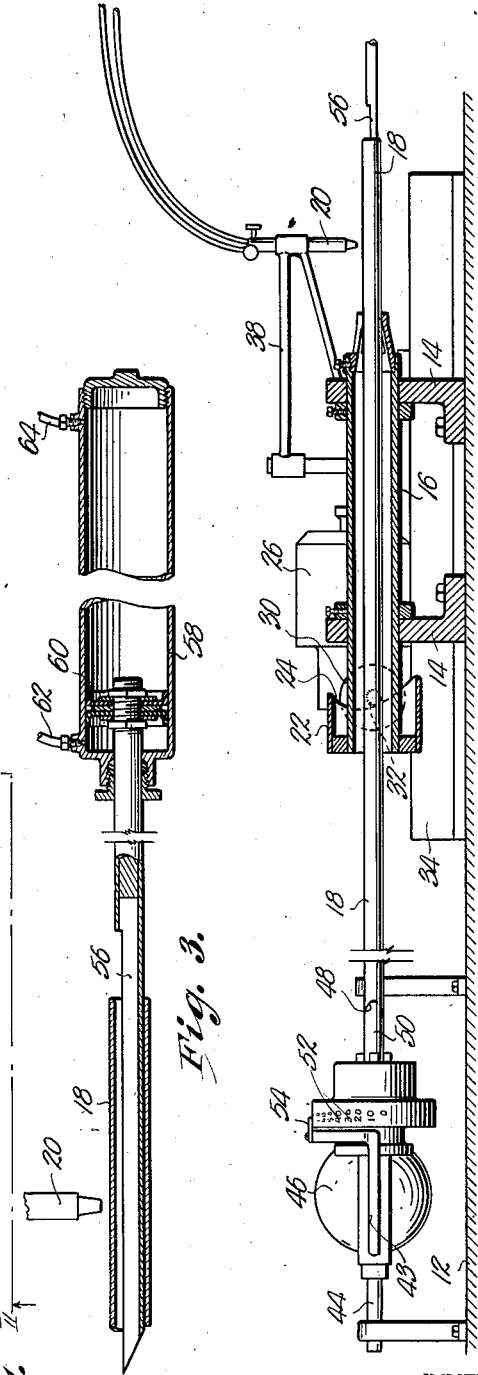
Fig. 2.
Fig. 3.
INVENTOR.
John S. McGuire
BY

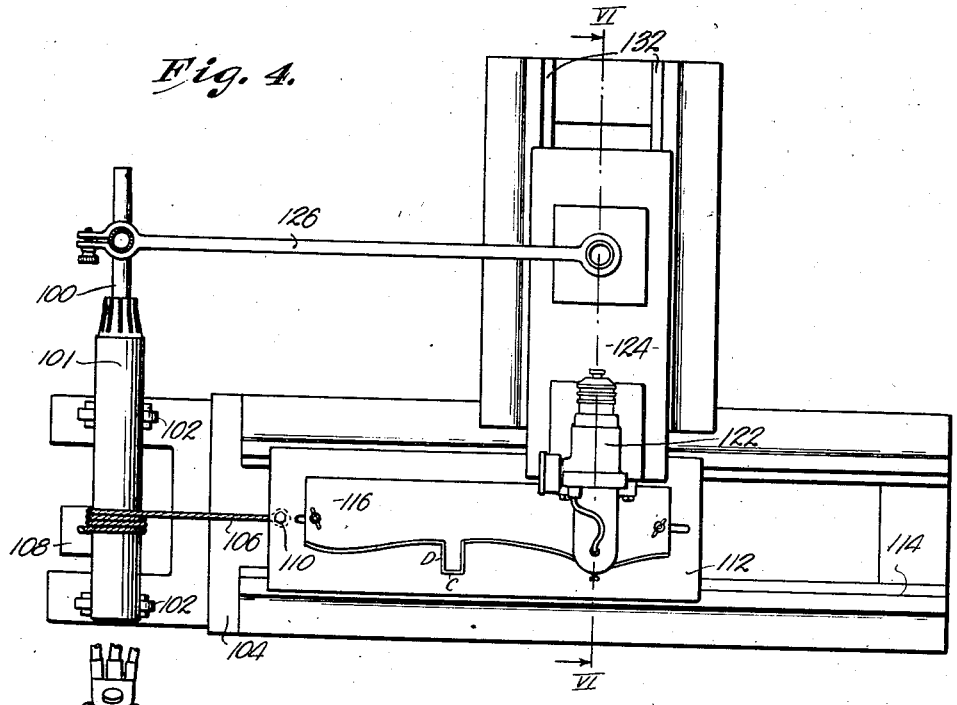
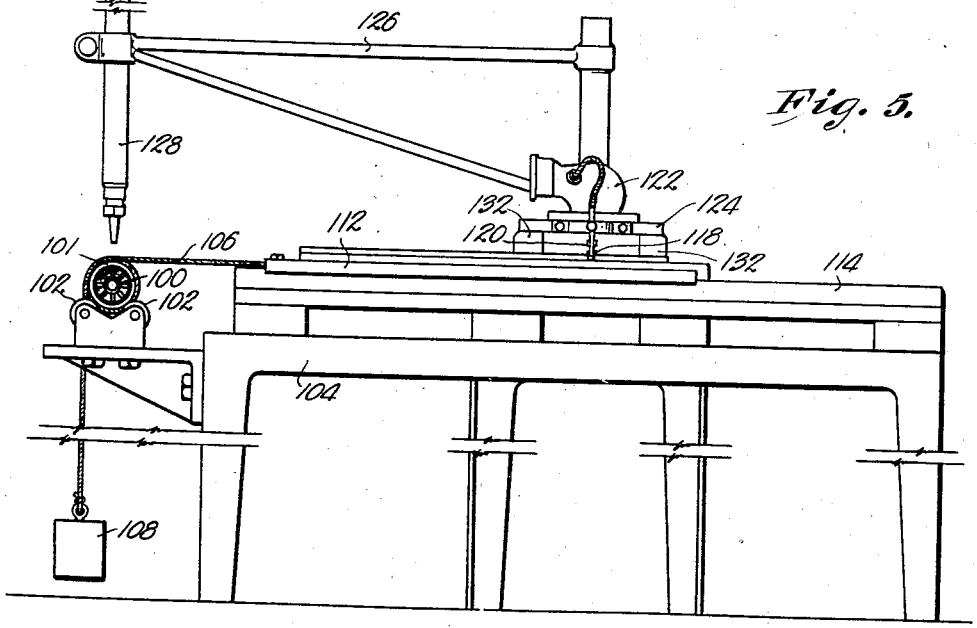

Sept. 8, 1942. J. S. McGUIRE 2,295,229
APPARATUS FOR CONTOURING THE ENDS OF TUBULAR STOCK
Filed Dec. 23, 1940 3 Sheets-Sheet 3
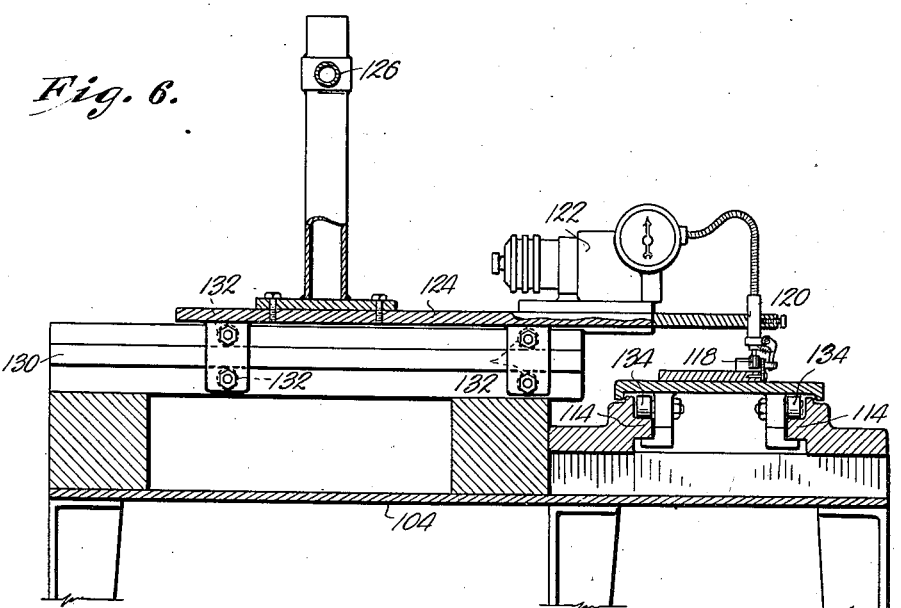
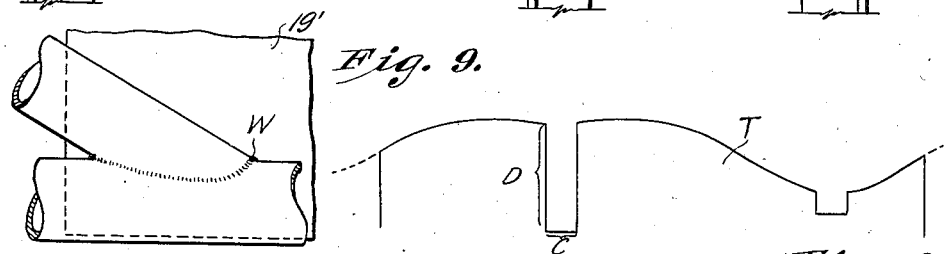
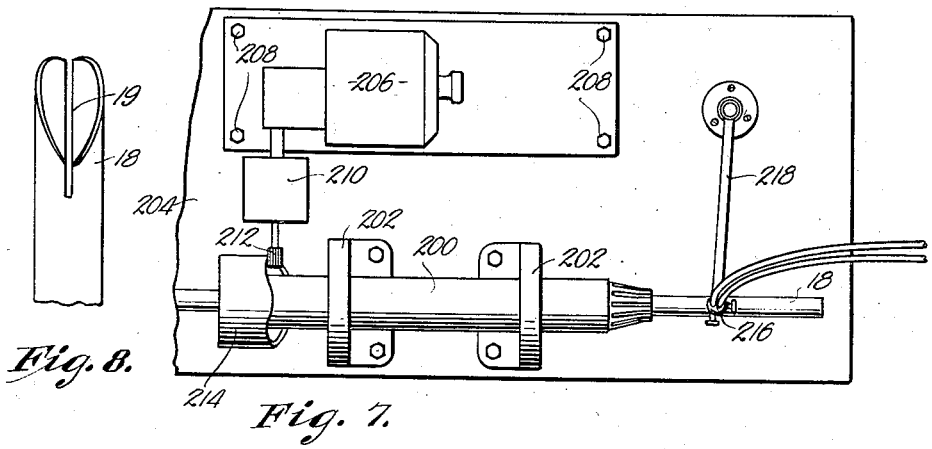
INVENTOR:
John S. McGuire
BY
ATTORNEY Patented Sept. 8, 1942

2,295,229

UNITED STATES PATENT OFFICE 2,295,229

APPARATUS FOR CONTOURING THE ENDS OF TUBULAR STOCK

John S. McGuire, Kansas City, Kans.

Application December 23, 1940, Serial No. 371,367

3 Claims. (Cl. 266—23)

This invention relates to apparatus for contouring ends of tubular stock and has for a primary object the provision of equipment including a gas cutting torch, for imparting movement to the torch and stock, whereby the latter may have the end thereof formed to meet requirements encountered at a particular joint where the contoured end of the tube is to be secured to other structural elements.

One of the important aims of this invention is to provide cutting equipment for tubing having relatively small diameters, and especially the tubing now commonly employed in the aircraft industry where the diameters are so small as to preclude the employment of present cutting equipment that has a minimum limit imposed thereon by the physical dimensions of such parts thereof as the tracing wheels.

A further object of the instant invention is to provide a machine for contouring the ends of tubes of comparatively small diameters having means for supporting the tube in juxtaposition to a cutting torch, apparatus for rotating the tube in its support, and means for reciprocating the torch as the tube is rotated, said machine employing a template wherein the transverse components are greater in length than the like components formed on the tube, but where the longitudinal components of the template are the same as the longitudinal components of the contoured tube end.

This invention has for a yet further object, the provision of cutting equipment for tubing whereing relative movement is imparted to a cutting torch and the tube through the medium of specially designed template, the nature of which permits contouring and slotting the ends of tubular stock of small diameters.

Another object of the invention is the provision in a machine of the aforementioned character, of equipment for protecting certain portions of the tube being cut and for collecting foreign matter as the cutting operation progresses.

It is a further aim of the present invention to provide novel, unique and inexpensive apparatus for embodying the broad concepts, which apparatus is capable of employing templates of either a planer or an annular form but which templates are developed with a transverse component greater than the transverse component of the cut being produced, to the end that small tubing, such as airplane stock, may have the ends thereof contoured and longitudinally slotted with the utmost degree of accuracy.

Minor objects of the invention, the manner of embodying the broad concepts in operable equipment, and the advantages arising from the use of the apparatus will appear during the course of the following specification, referring to the accompanying drawings wherein:

Fig. 1 is a top plan view of a machine for contouring the ends of tubular stock, made in accordance with the present invention.

Fig. 2 is a vertical sectional view through the same taken on line II—II of Fig. 1.

Fig. 3 is an enlarged fragmentary longitudinal sectional view through the slag collecting tray and its operating mechanism.

Fig. 4 is a top plan view of apparatus for contouring the ends of tubular stock, made in accordance with a modified form of the invention.

Fig. 5 is a side elevational view of the machine shown in Fig. 4.

Fig. 6 is a vertical cross sectional view taken on line VI—VI of Fig. 4.

Fig. 7 is a fragmentary plan view of a machine embodying the invention made to illustrate a modified form thereof.

Fig. 8 is a fragmentary side elevational view of a length of tubing showing the contoured end thereof.

Fig. 9 is a fragmentary elevational view of a joint between the tubing shown in Fig. 8 and another tubular structural element; and Fig. 10 is a diagrammatic view illustrating the template employed in producing the cut shown at the end of the tube illustrated in Fig. 8.

Heretofore, conventional templates employed in guiding cutting torches for producing shapes from stock have been developed by using the principles of descriptive geometry but where tubular members of small diameters are to be severed and contoured and where such tubular stock is to be provided with longitudinal slots for the reception of gusset plates, for example, one of the components of the template was too short due to the tracing wheel, which must of necessity, have a dimension that could not drop below a certain minimum.

Airplane tubing having diameters less than 1 in. is common and where engine mounts are formed from such tubing, for example, the joints created by the juncture of several lengths of tubing embodies unusual demands upon the equipment employed to contour the said ends. Heretofore, expensive operations have been followed, hand-work has been the usual method employed and inaccuracy is the result.

The equipment contemplated by this invention not only is capable of producing contours not possible by methods now known, but will operate at speeds commensurate with the demands of the industry. Actual tests show that 1 in. aircraft tubing having a wall thickness of .065 in. may be contoured in from 5 to 7 sec. The following specification makes clear the manner of constructing and operating apparatus illustrated in the drawings. It must be borne in mind that equipment different from that about to be described however, may be utilized without effecting the result so long as the basic concepts are followed.

In Figs. 1, 2 and 3 the preferred form of the invention is shown and the apparatus diagrammatically illustrated therein comprises any suitable support in the nature of a table 12 upon which is mounted blocks 14 for journalling chuck 16 through which is projected the tube 18 into juxtaposition to torch 20. Torch 20 is conventional in design. In this specification "longitudinal" refers to a direction parallel the length of tube 18, and "transverse" refers to a direction at right angles to the length of tube 18.

Annular template 22 mounted upon chuck 16 for rotation therewith, has a contoured face 24 consisting of both transverse and longitudinal components. These components have a definite relation to the path of travel of torch 20 and the relation of the transverse and longitudinal components of template 22, with respect to components of the cut, will be hereinafter set down in a description which will clarify the relation of the components of the later described planar template and the path of the cut.

Motor 26 mounted upon table 28 drives the magnetic tracing device 30 having the wheel 32. This wheel 32 is in contact with contoured face 24 and remains in such position because of the action of magnetic tracing device 30. This device has heretofore been employed in the art and the characteristics thereof are therefore well-known.

Table 28 is mounted upon tracks 34 through the medium of rollers or the like 36 for free reciprocation. Torch 20 mounted upon the free end of arm 38 moves with table 28 for said arm 38 is mounted upon table 28 as at 40.

In most instances, the contour at one end of tubing 18 must be cut with respect to the contour of the other end thereof. Means for properly holding tube 18 therefore, is provided in the nature of an indexing device, generally designated by the numeral 42 that is swingably carried by bracket 43 mounted upon shaft 44 and counterweighted as at 46. Tube 18 has the end 48 contoured as illustrated in Fig. 1 and a short piece of tube 50 having a contour complementary to the shape of end 48 is mounted in indexing device 42.

Indicia 52 cooperate with pointer 54 in allowing the operator to position tube 18 with respect to torch 20. Indicia 52 should indicate the degrees of a circle and when member 50 is rotated with indexing device 42, tube 18 is positioned to cause torch 20 to properly form the end adjacent thereto.

As the jet from torch 20 passes through the wall of tube 18, a certain amount of slag and foreign matter collects within tube 18 that would normally affect the cut as the tube is rotated about its axis. This invention contemplates means for collecting such slag and the illustrated embodiment of the collecting means, shown in Fig. 3, comprises a tray 56 positionable within the end of tube 18 below the point where the jet from torch 20 passes through the wall of the tube. Tray 56 is reciprocably mounted and is spaced from the inner face of tube 18 so as not to establish frictional engagement to retard the action of the apparatus. Such equipment as is adaptable for moving tray 56 longitudinally to and from the position shown in Fig. 3, may be employed. It has been found satisfactory to use an air cylinder 58 having a piston 60 therein and supplied with motivating fluid through tubes 62 and 64.

A modified form of the invention is diagrammatically shown in Figs. 4, 5 and 6. In this instance, tube 100 is mounted for rotation with chuck 101, which in turn rests upon rollers 102 carried by table 104, and is revolved about its axis through the medium of cable 106 having weight 108 thereon. This cable 106 is wrapped around chuck 101 and while weight 108 is at one end thereof, the other end is secured as at 110 to plate 112 reciprocably mounted upon tracks 114 carried by table 104.

Planar template 116 supported on plate 112 is engaged by wheel 118 forming a part of the magnetic tracing device 120 driven by motor 122. Motor 122 is mounted on table 124 with bracket 126 that carries torch 128. Table 124 is reciprocably mounted on a part of table 104 through the medium of tracks 130 and rollers 132. Plate 112 rides over tracks 114 and wheels 134 contribute to the ease of operation.

In Fig. 7 a modified form of the invention is shown and when an understanding of the apparatus illustrated in Figs. 1 and 2 is in mind, it will be easy to understand that the form of chuck 200 is easily both slidably and rotatably journalled in bearings 202 mounted on table 204. Motor 206 is fixed to table 204 by bolts 208 and the magnetic tracing device 210 has wheel 212 to ride over the face of template 214 in exactly the same manner as heretofore mentioned.

Torch 216 carried by bracket 218 is not movable but the tube 18 is carried by chuck 200 to move both longitudinally and rotatably with respect to torch 216. Precisely the same results are accomplished when this form of the apparatus is used as when the forms shown in Figs. 1 to 6 inclusive are employed.

Templates 22 and 116 are developed after the contour desired to be produced at the end of tube 18 is determined. The longitudinal components of the templates remain the same in magnitude as the longitudinal components of the cut to be produced. The transverse components are increased in magnitude due to the limitations imposed upon the apparatus by the size of the tracing wheels.

In Figs. 8 and 9, an example of tube contouring is shown. The tube 18 that has been cut in either of the machines illustrated and described, has a slot 19 longitudinally formed therein to receive gusset plate 19'. Because the cut created is always radial in nature, the weld as shown at W, is the most effective for a minimum amount of the stock forming the tubes is consumed.

The contour at the end of tube 18 illustrated in Fig. 8, comprises both longitudinal and transverse components and the template T, illustrated in Fig. 10, is that employed to form the end of tube 18. The transverse component at point C on template T, is, in this instance, four times as great as the transverse component on the tube, which is of course, the width of slot 19. The longitudinal component at point D is the same as the like longitudinal component on the tube 18 which is the length of slot 19.

Where slotting is to be accomplished, the general formula for computation is: width of desired slot times ratio of enlargement plus diameter of the tracing wheel. The tracing wheel traverses the cam face of the template T, and regardless of where the tracing wheel may be either a transverse or longitudinal component or a combination of the two is involved. Briefly, therefore, the template, regardless of its form has longitudinal components in direct ratio to the vertical components of the cut, but the transverse components of the template are longer than the transverse components of the cut.

In the two forms shown in Figs. 1 to 6 inclusive, the longitudinal components are formed by moving the torch through its path of travel. In other words, the torch is reciprocated as the motor drives the tracing wheels over the faces of the templates. The transverse components of the templates are transmitted to the cut by rotating the tube.

The foregoing specification indicates clearly the manner of operating the contouring apparatus and it is obvious that tubes of relatively small diameters may be cut to proper form with accuracy and dispatch. The fact that the invention is capable of being embodied in machines having physical characteristics of different types, indicates that any number of different machine forms may be developed without departing from the spirit of the invention or scope of the appended claims.

Having thus described the invention, what is claimed as new and desired to be secured by Letters Patent is:

1. In a machine for contouring the ends of tubes, a cutting torch; a template having both transverse and longitudinal components; means for supporting the tube in juxtaposition to the torch; apparatus for rotating the tube in its support, controlled by the transverse components of the template; and means controlled by the longitudinal components of the template for reciprocating the torch as the tube is rotated.

2. In a machine for contouring the ends of tubes, a cutting torch; a table for supporting the torch in juxtaposition to the tube being mounted for the free reciprocation thereof in a direction parallel to the length of the tube; an annular template having both transverse and longitudinal components; a chuck for rotation of the template and the tube; means for rotating the chuck controlled by the transverse components of the template; and means controlled by the longitudinal components of the template for reciprocating the table as the tube is rotated.

3. In a machine for contouring the ends of tubes, a cutting torch; a table for supporting the torch in juxtaposition to the tube being mounted for the free reciprocation thereof in a direction parallel to the length of the tube; a planar template having both transverse and longitudinal components; a chuck for rotation of the tube; tracks for movably supporting the template; means for rotating the chuck controlled by transverse components of the template; and means controlled by the longitudinal components of the template for reciprocating the table as the tube is rotated.

JOHN S. McGUIRE.